United States Patent
Konishi et al.

(10) Patent No.: US 6,298,359 B1
(45) Date of Patent: Oct. 2, 2001

(54) DOCUMENT OUTPUT DEVICE

(75) Inventors: Masao Konishi, Iruma; Yoshitsugu Takahashi, Fussa; Fuminori Sano, Haruma; Kazue Osawa, Tokorozawa; Chika Sasaki, Fussa; Katsuji Takano, Musashimurayama; Takehiko Mizoguchi, Akiruno, all of (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 08/981,784

(22) PCT Filed: Apr. 30, 1997

(86) PCT No.: PCT/JP97/01485

§ 371 Date: Dec. 17, 1997

§ 102(e) Date: Dec. 17, 1997

(87) PCT Pub. No.: WO97/41522

PCT Pub. Date: Nov. 6, 1997

(30) Foreign Application Priority Data

May 1, 1996 (JP) .................................................. 8-110904
May 10, 1996 (JP) .................................................. 8-116514

(51) Int. Cl.[7] .................................................. G06F 17/00
(52) U.S. Cl. .................................................. 707/528; 707/520
(58) Field of Search .................................... 707/508, 526, 707/527, 528, 503, 104, 520; 345/334, 339, 350, 418, 431; 358/1.18

(56) References Cited

U.S. PATENT DOCUMENTS

| | | | | |
|---|---|---|---|---|
| 5,045,967 | * | 9/1991 | Igarashi | 707/528 |
| 5,123,088 | * | 6/1992 | Kashara | 707/104 |
| 5,140,402 | * | 8/1992 | Murakata | 257/499 |
| 5,615,320 | * | 3/1997 | Lavendel | 345/431 |
| 5,644,692 | * | 7/1997 | Eick | 345/326 |
| 5,742,777 | * | 4/1998 | Eick | 345/326 |
| 5,909,539 | * | 6/1999 | Chikauchi | 707/528 |
| 5,960,448 | * | 9/1999 | Reichek et al. | 707/526 |

* cited by examiner

Primary Examiner—Joseph H. Feild
(74) Attorney, Agent, or Firm—Frishauf, Holtz, Goodman, Langer & Chick, P.C.

(57) ABSTRACT

A color table stores a plurality of discriminating information so as to discriminate a predetermined data of a document data and a color information corresponding to each discriminating information. An area information indicative of a position on the document which is additionally outputted is stored. When the document is printed, a predetermined data of the document data is discriminated, and the color information corresponding to the discriminated predetermined data is retrieved from the color table. An image generated by an identified color according to the retrieved color information is drawn on the document at a predetermined position indicated by the area information. Accordingly, by an image color which is additionally outputted at the predetermined position, a user can simply identify a type of the document and inherent information of the document by its appearance at a glance.

6 Claims, 15 Drawing Sheets

FIG.3

| | A | B | C | D | E | |
|---|---|---|---|---|---|---|
| | SORT OF DOCUMENT | CLIENT NAME | ACCOUNT DATE | ISSUE YEAR | ISSUE DATE | ・・・・・・ |
| 1 | BILL | ABC Co.,Ltd. | 20TH DAY | 1994 | MAY 29 | ・・・・・・ |
| 2 | BILL | XYZ Co.,Ltd. | THE END OF MONTH | 1995 | OCTOBER 31 | ・・・・・・ |
| 3 | ・・・・・・ | ・・・・・・ | ・・・・・・ | ・・・・・・ | ・・・・・・ | |

FIG.4A

| DICTIONARY SPECIFICATION | ACCOUNT DATE TABLE | |
|---|---|---|
| CELL | EVALUATION NAME | ADDITIONAL AREA |
| C2 | ACCOUNT DATE | RIGHT EDGE PORTION |
| C3 | ACCOUNT DATE | RIGHT EDGE PORTION |

FIG.4B

| DICTIONARY SPECIFICATION | ISSUE DATE TABLE | |
|---|---|---|
| CELL | EVALUATION NAME | ADDITIONAL AREA |
| D2 | ISSUE YEAR | UPPER-RIGHT CORNER 1 |
| D3 | ISSUE YEAR | UPPER-RIGHT CORNER 1 |
| ～ | ～ | ～ |
| E2 | ISSUE MONTH | UPPER-RIGHT CORNER 2 |
| E3 | ISSUE MONTH | UPPER-RIGHT CORNER 2 |

FIG.4C

| DICTIONARY SPECIFICATION | CLIENT TABLE | |
|---|---|---|
| CELL | EVALUATION NAME | ADDITIONAL AREA |
| B2 | CLIENT NAME | PERIPHERAL PORTION |
| B3 | CLIENT NAME | PERIPHERAL PORTION |

FIG.5A

| DICTIONARY NAME | ACCOUNT DATE TABLE | |
|---|---|---|
| EVALUATION NAME | CONDITION | COLOR |
| ACCOUNT DATE | 20TH DAY | BLUE |
| | THE END OF MONTH | RED |

FIG.5B

| DICTIONARY NAME | CLIENT TABLE | |
|---|---|---|
| EVALUATION NAME | CONDITION | COLOR |
| CLIENT NAME | ABC Co., Ltd. | BLUE |
| | XYZ Co., Ltd. | RED |

FIG.5C

| DICTIONARY NAME | ISSUE DATE TABLE | |
|---|---|---|
| EVALUATION NAME | CONDITION | COLOR |
| ISSUE YEAR | 1994 | GREEN |
| | 1995 | RED |
| | 1996 | BLUE |
| | 1997 | YELLOW |
| | ⋮ | ⋮ |
| ISSUE MONTH | JANUARY | RED (HALFTONE 1) |
| | FEBRUARY | RED (HALFTONE 2) |
| | ⋮ | ⋮ |
| | NOVEMBER | BLUE (HALFTONE 5) |
| | DECEMBER | BLUE (HALFTONE 6) |

COLOR TAG

MAY 29, 1994

MAY 29, 1995

OCTOBER 31, 1995

| SPECIFIED COLOR | BLUE |
|---|---|
| RANGE | A1:A7 |
| CHANGING DIRECTION | ASCENDING ORDER |

FIG.15A

|   | A | B | C | D |
|---|---|---|---|---|
| 1 | 120 | 120 | | |
| 2 | 2500 | 2500 | | |
| 3 | 5200 | 5200 | | |
| 4 | 280 | 280 | | |
| 5 | 2320 | 2320 | | |
| 6 | 1200 | 1200 | | |
| 7 | 5860 | 5860 | | |
|   | | | | |

FIG.15B

|   | A | B | C | D |
|---|---|---|---|---|
| 1 | 120 | 120 | | |
| 2 | 2500 | 2500 | | |
| 3 | 5200 | 5200 | | |
| 4 | 280 | 280 | | |
| 5 | 2320 | 2320 | | |
| 6 | 1200 | 1200 | | |
| 7 | 5860 | 5860 | | |
|   | | | | |

FIG.16

| NUMERICAL VALUE | CELL COORDINATE | BACKGROUND COLOR | TONE |
|---|---|---|---|
| 120 | A1 | BLUE | 1 |
| 280 | A4 | BLUE | 1 |
| 1200 | A6 | BLUE | 2 |
| 2320 | A5 | BLUE | 2 |
| 2500 | A2 | BLUE | 3 |
| 5200 | A3 | BLUE | 3 |
| 5860 | A7 | BLUE | 3 |
|  |  |  |  |

DOCUMENT OUTPUT DEVICE

TECHNICAL FIELD

This invention relates to a document output device for outputting a document data.

BACKGROUND ART

Recently, various application programs for a spreadsheet, a database and the like are used in an office computer and a general purpose computer for mainly processing business matters. They are provided with a document data output function which can output a totalized table data in various-formed documents.

When the document data is printed out by the document data output function, a mark (meshing, etc.) is printed out as a method of identifying portions of the document data at an edge of the document data or the like for each predetermined unit such as each chapter and each category.

However, when the document data is printed out by such a conventional document data output function, each predetermined unit such as each chapter and each category is judged as the method of identifying the document data, so that the mark (meshing, etc.) is printed out at the edge of the document data or the like. There is such a problem that the identifying method cannot be optionally specified by a user and a complex information cannot be identified by using plural colors.

Thus, in case of a plurality of classified items, a print of a color mark cannot be flexibly set according to the identified items and a printed area in the document data which are desired by the user.

Accordingly, a color mark print function is not sufficient, and its utility is low.

Furthermore, in order to output the document data, it is necessary to set definition contents such as its form, its output mode or the like. For example, a document data definition function contained in the application program is used, so that the document data is outputted. First, a document form is set, and then the item to be outputted in the document data and item definition contents are set. A record file name (table file name) in which the data to be outputted is spread is set. The output mode is set on a screen.

When the document data which is set in the above procedure is displayed on the screen, a type of the data outputted for each cell which is spread in the document data is a character, a numerical value, a result calculated from a plurality of items or the like. Furthermore, a conventional document data definition function is provided with such a function that the output mode of the data to be outputted for each cell is defined for each cell. The definition function is used, so that, for example, an output color of the data can be specified for each cell.

However, according to an output mode definition function of cell data in the document data definition function contained in various application programs such as a conventional spreadsheet, database, etc., when the function defined for each cell is used, the definition contents of the output mode of the data to be outputted for each cell must be set for each cell. Accordingly, it takes much time and labor to set the definition contents of the output mode. There is such a problem that the output mode definition function of the cell data is effectively used.

Furthermore, even if the output mode of a desired cell which is spread in the document data displayed on the screen is changed, similarly, it takes much time and labor to set the definition contents of the output mode. Accordingly, it is difficult to use the output mode definition function of the cell data.

It is an object of the present invention to provide a document output device in which the user can simply identify a type of the document data and inherent information of the document data by its appearance at a glance according to a color of an image which is additionally printed at a predetermined position on the document data.

DISCLOSURE OF INVENTION

According to the present invention, there is provided a document output device comprising:

a color table for storing a plurality of discriminating information indicative of predetermined data in document data and a plurality of color information corresponding to the plurality of discriminating information, storage means for storing an area information indicative of a position on the document data at which an additional information is output, retrieval means for detecting the predetermined data in the document data and for retrieving the color information corresponding to the detected predetermined data from the color table, and output means for drawing an image with a color according to the color information retrieved by the retrieval means at the position on the document data indicated by the area information and for performing an additional output according to the predetermined data.

Therefore, according to the present invention, by the image color which is additionally outputted at a predetermined position on the document data, the user can identify the type of the document data and inherent information of the document data by its appearance at a glance.

BRIEF DESCRIPTION OF DRAWINGS

FIG. 3 shows an example of a document data stored in a document data memory;

FIGS. 4A to 4C show an example of a color information table stored in a color dictionary memory;

FIGS. 5A to 5C show an example of a color definition dictionary table stored in a color definition dictionary memory;

FIG. 15A shows an example of a document data;

FIG. 15B shows an example of the document in which given cells are printed with halftone by the document printout process shown in FIG. 14; and FIG. 16 shows an example of a sorted document data.

BEST MODE OF CARRYING OUT THE INVENTION

The present invention will be described below with reference to the accompanying drawings.

FIGS. 1 to 9B show an embodiment of a computer system to which a first embodiment according to the present invention is applied.

Figure 1:
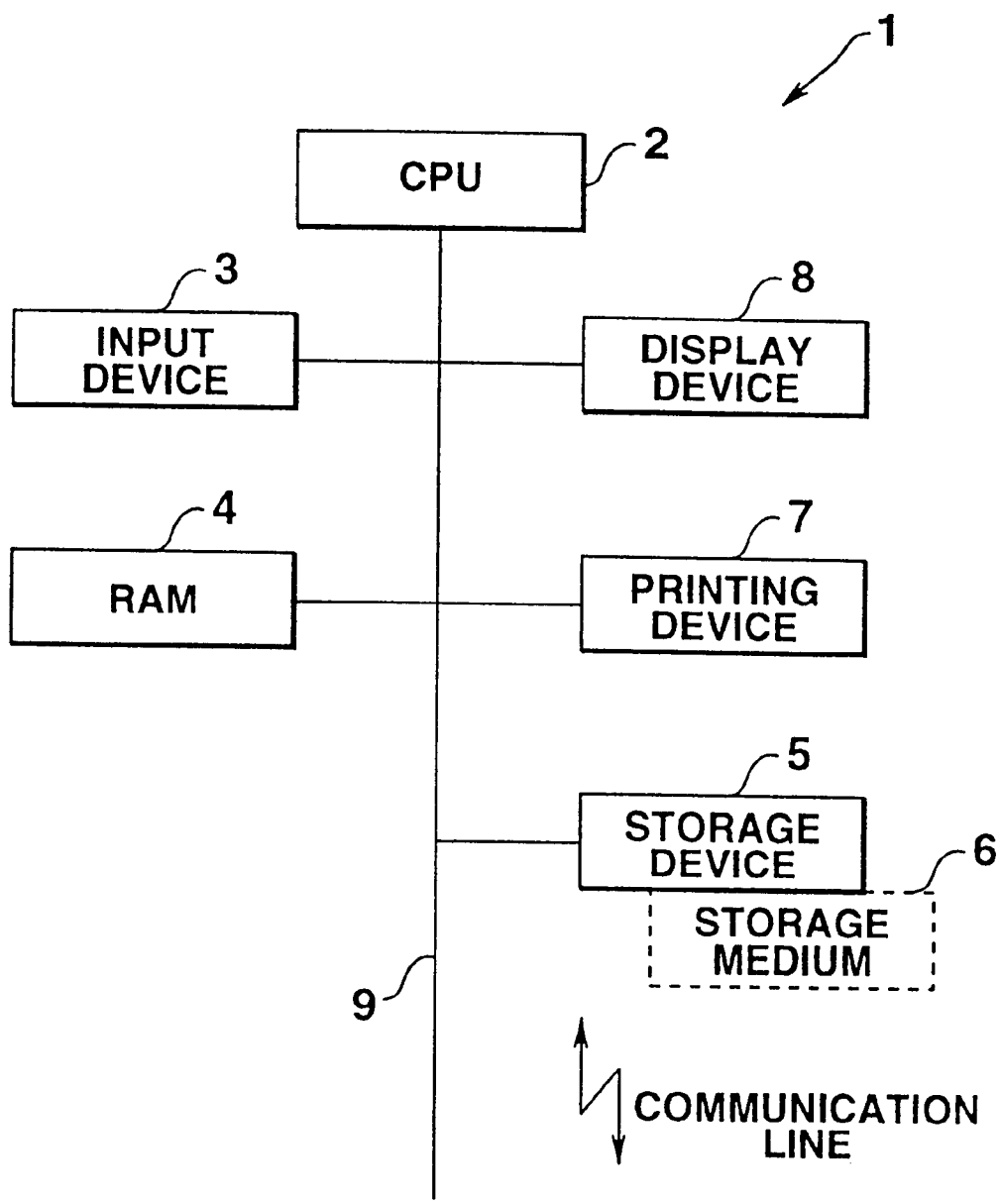
FIG. 1 is a block diagram showing a main portion of a computer system according to a first embodiment of the present invention.
Figure 2:
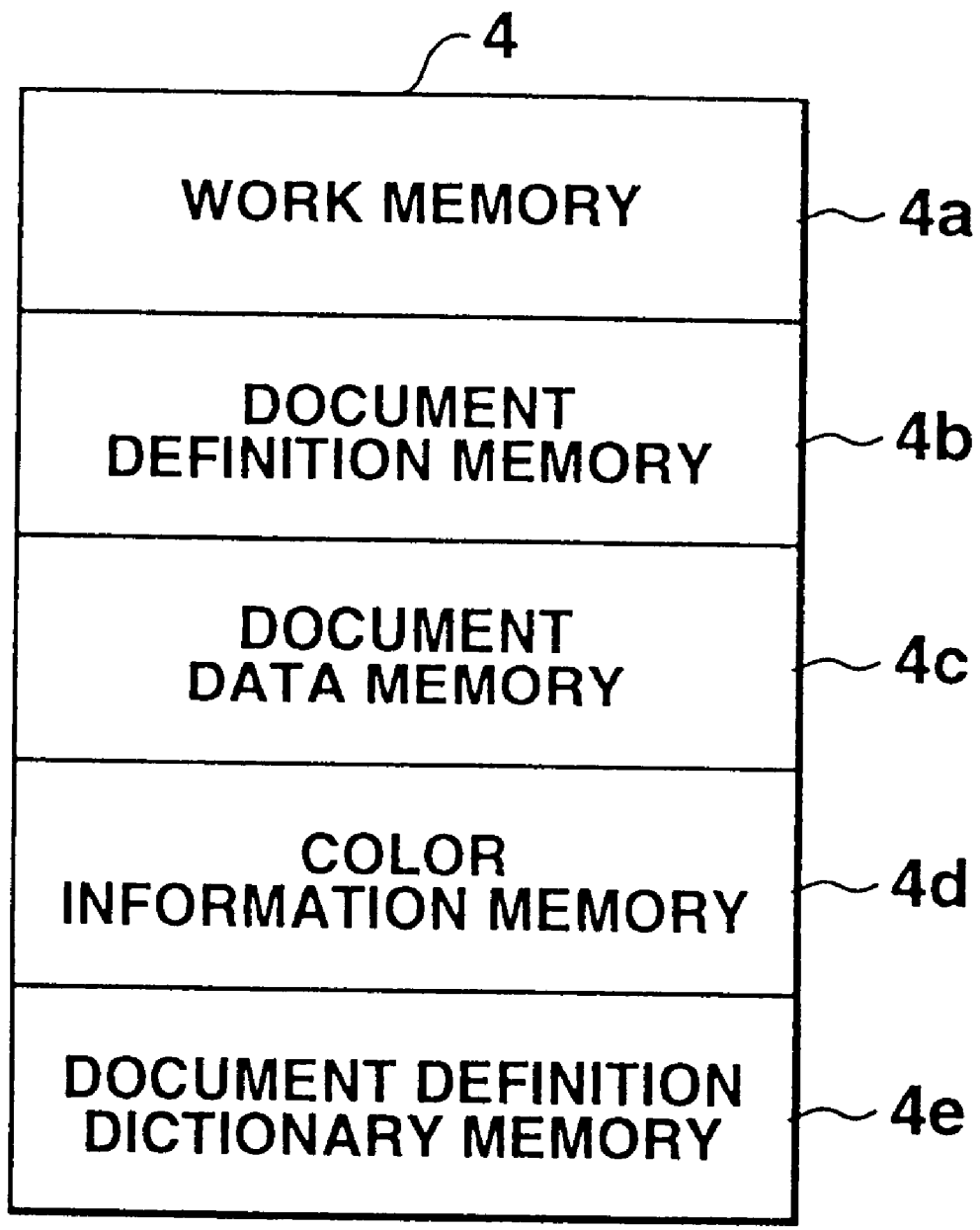
FIG. 2 shows contents of a RAM.

FIG. 1 is a block diagram showing a main portion of a computer system 1. The computer system 1 comprises a CPU 2, an input device 3, a RAM 4, a storage device 5, a storage medium 6, a printing device 7 and a display device 8. Each device is connected to a bus line 9.

The CPU (Central Processing Unit) 2 stores an application program specified among the Windows (trademark) system programs as a GUI (graphic user interface) programs and the various application programs based on the Windows system which are stored in the storage device 5 and various instructions or data inputted from the input device 3 in a work memory 4a in the RAM 4. According to the input instruction and input data, various processings are operated based on the application programs stored in the RAM 4. The result of processing is stored in the work memory 4a in the RAM 4, and it is displayed in the display device 8. The result of processing stored in the work memory 4a is saved in a given address of the storage device 5 which is instructed by the input device 3.

Furthermore, in a document printout process described below as an output process of a document data stored in a document data memory 4c in the RAM 4, the CPU 2 obtains a color information table which defines a coloring information corresponding to each cell data in the document data to be printed out. Based on a dictionary specification information which is set in the color information table, a color dictionary table is read from a color definition dictionary memory 4e. Based on a color information which is set according to an evaluation condition in the read color dictionary table and an additional area information defined in the color information table, the CPU 2 is operated in such a manner that a specified-colored color tag is printed out at a specified position in the document data by the printing device 7.

The input device 3 comprises a keyboard provided with a cursor key, a numerical input key, various function keys, etc. and a mouse being a pointing device. A press signal indicative of the pressed key on the keyboard is outputted to the CPU 2. An operation signal by the mouse is outputted to the CPU 2.

The RAM (Random Access Memory) 4 comprises the work memory 4a, document data definition memory 4b, document data memory 4c, color information memory 4d and color definition dictionary memory 4e. The work memory 4a stores the specified application program, the input instruction, the input data, the result of processing, etc.. The document data definition memory 4b stores a definition table for defining contents of the document data.

The document data memory 4c stores the document data. The color information memory 4d stores the color information table in which a definition information for defining cell information to be detected in the document data, the additional area information indicative of a color tag printout position and the dictionary specification information are set. The color definition dictionary memory 4e stores various color dictionary tables corresponding to the dictionary specification information which is set in the color information table.

The storage device 5 has the storage medium 6 in which the program, the data, etc. are previously stored. The storage medium 6 comprises a magnetic recording media, an optical recording media or a semiconductor memory. The storage medium 6 is fixedly housed in the storage device 5, or the storage medium 6 is detachably mounted to the storage device 5. The storage medium 6 stores the Windows system program as the GUI, various application programs corresponding to the Windows system, the data processed by a document printout processing program and each processing program, etc.

Furthermore, the program, the data, etc. to be stored in the storage medium 6 may be transmitted from another equipment connected via a communication line, etc. Furthermore, the present equipment does not comprise the storage device 5 and another equipment connected via the communication line, etc. is provided with the storage device 5 so that the program and the data stored in the storage medium 6 can be used via the communication line.

The printing device 7 prints out a printout data (the document data, etc.) supplied from the CPU 2 with the specified color.

The display device 8 comprises a CRT (Cathode Ray Tube) display and the like. A display data supplied from the CPU 2 is displayed with the specified color.

Next, an operation of the first embodiment according to the present invention will be described below.

At first, an example of the document stored in the document data memory 4c in the RAM 4 is shown in FIG. 3. In the document data, a type of the document data column (A), a client name column (B), an account date column (C), an issue year column (D) and an issue date (E) are set as an item column. The data is set in the cell below each item column.

Next, an example of the color information table stored in the color information memory 4d in the RAM 4 will be described with reference to FIGS. 4A to 4C.

According to the color information table of the first embodiment of the present invention, as shown in FIGS. 4A to 4C, the dictionary specification information (color definition dictionary specification information) is set in a color dictionary specifying column in an uppermost row. A cell number to be detected (cell information to be detected) is set in a cell column. An item name to be detected (item name to be detected) is set in an evaluation name column. A position information in the document data sheet in which the color tag is printed out is set in an additional area column.

According to the color information table shown in FIG. 4A, "account date table" is set in a dictionary specifying row. "C2, C3" are set in the cell column as the cell number to be detected. "Account date" is set in the evaluation name column. "Right edge portion" is set in the additional area column.

According to the color information table shown in FIG. 4B, "issue data table" is set in the dictionary specifying row. "D2 to E3" are set in the cell column as the cell number to be detected. "Issue year" is set in the evaluation name column. "Upper-right corner" is set in the additional area column.

According to the color information table shown in FIG. 4C, "client table" is set in the dictionary specifying column. "B2, B3" are set in the cell column as the cell number to be detected. "Client name" is set in the evaluation name column. "Peripheral portion" is set in the additional area column.

A defined item in the color information tables can be optionally set, and it is not limited to the examples shown in FIGS. 4A to 4C.

Next, an example of the color definition dictionary table stored in the color definition dictionary memory 4e will be described with reference to FIGS. 5A to 5C.

According to the color definition dictionary table of the first embodiment of the present invention, as shown in FIGS. 5A to 5C, a dictionary name is set in a dictionary name row in the uppermost row. The evaluation name (item name to be detected) is set in the evaluation name column. The evaluation condition for judging whether the item name is correspond to the evaluation name is set in the condition column. The color information for each of the evaluation condition which is set in the condition column is set in a color column.

According to the color definition dictionary table shown in FIG. 5A, "account data table" is set in the dictionary name row. "Account date" is set in the evaluation name column. A condition information such as "20th day, the end of the month" is set in the condition column. The color information such as "blue, red" is set in the color column.

According to the color definition dictionary table shown in FIG. 5B, "client table" is set in the dictionary name row. "Client name" is set in the evaluation name column. "ABC Co., Ltd., XYZ Co., Ltd." are set in the condition column. "Blue, red" are set in the color column.

According to an issue date table shown in FIG. 5C, "issue year, issue month" are set in the dictionary name column. "1994 to 1997, January to December" are set in the condition column. "Green, red, blue, yellow, red (tone 1), red (tone 2), blue (tone 5), blue (tone 6)" are set in the color column. In this case, red (tones 1 to 6) is set from January to June, and blue (tones 1 to 6) is set from July to December.

The color definition dictionary tables are not limited to the above example. The color definition dictionary table in which other dictionary name, evaluation name, evaluation condition and color information are set may be prepared.

Figure 6:
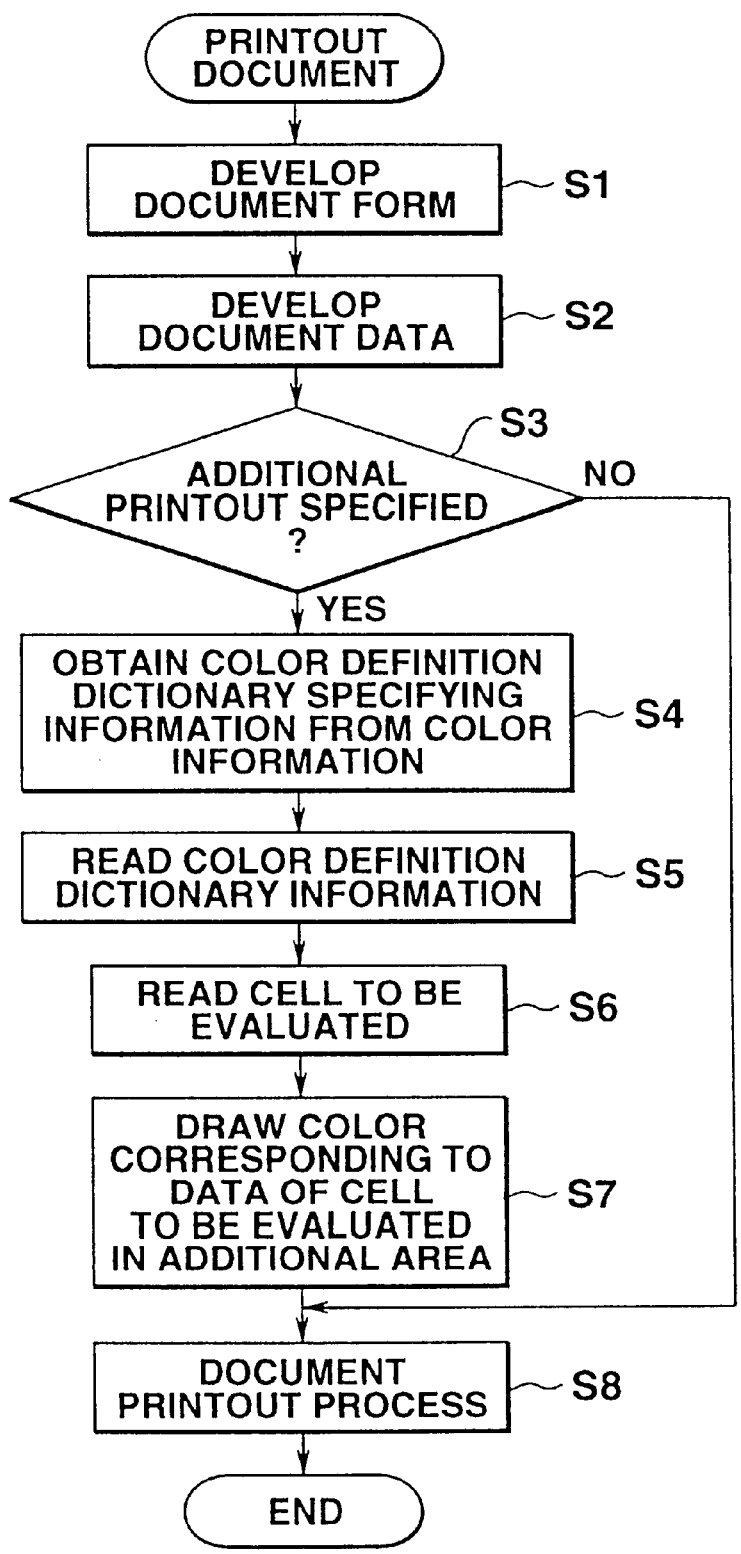
FIG. 6 is a flow chart showing an operation of a document printout process.

The document printout process operated by the CPU 2 according to the definition contents of each color information of the color information tables shown in FIGS. 4A to 4C and the color definition dictionary tables shown in FIGS. 5A to 5C will be described with reference to a flow chart shown in FIG. 6. The program for realizing each function described in the flow chart is stored in the storage medium 6 in a program code which can be read by the CPU 2.

At first, the document printout process is instructed by an input from the input device 3. When the document data to be printed out is instructed, the CPU 2 starts the document printout process. A document form of the document data is read from the document data memory 4c in the RAM 4. The form is developed in the work memory 4a, and it is displayed in the display device 8 (step S1). The document data is developed in the developed document form, and it is displayed in the display device 8 (step S2). Whether or not an additional printout is instructed is determined (step S3).

When the additional printout is not instructed, the document data which is developed in the work memory 4a is printed out with a predetermined paper by the printing device 7 (step S8). When the additional printout is instructed, a color definition dictionary name information specified in the dictionary specifying column of the color information table in which the color information table of the specified document data is set in the color information memory 4d in the RAM 4 is obtained (step S4).

That is, the color definition dictionary table name of "account date table", "issue date table", "client table", etc. which are set in the dictionary specifying column in the color information table shown in FIGS. 4A to 4C are obtained.

The color definition dictionary table of the specified color definition dictionary name is read from the color definition dictionary memory 4e in the RAM 4 (step S5). The cell information to be detected which is set in the color definition dictionary table is read from the evaluation name column (step S6). That is, "account date", "client name", "issue year", "issue month", etc. are read from the evaluation name column in the color definition dictionary table shown in FIGS. 5A to 5C.

The color information corresponding to the data of the cell to be detected is obtained according to the evaluation condition which is set in the color definition dictionary table. According to the obtained color information, in response to the additional area which is set in the additional area column in the color information table, the color tag is drawn in a specified area in the document data which is developed in the step S1 (step S7).

That is, the color information corresponding to the evaluation condition is obtained from a plurality of color information which is set in the color column in the color definition dictionary table shown in FIGS. 5A to 5C. The color tag corresponding to the obtained color information is drawn in the specified area in the document data shown by "right edge portion", "upper-right corner", etc. which are set in the additional area column in the color information table shown in FIGS. 4A to 4C.

The document form and the document data which are developed in the work memory 4a in steps S1 and S2 and the contents of the color tag drawn in the step S7 are printed out by the printing device 7 with a predetermined paper (step S8). The process is completed.

Figure 7A:
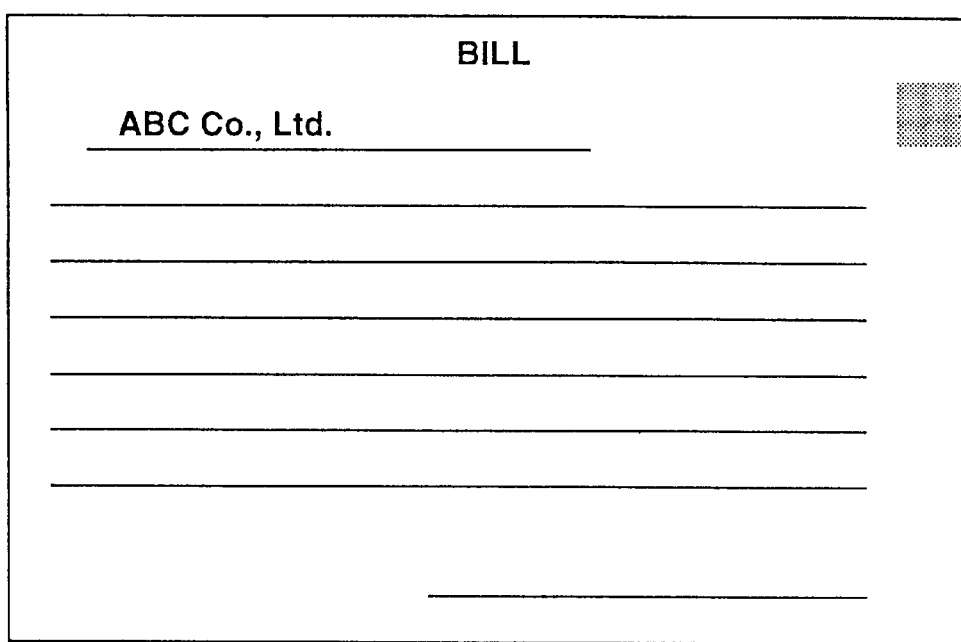
FIGS. 7A and 7B show an example of the document in which a color tag is printed out at an upper-right edge portion of the document.
Figure 7B:
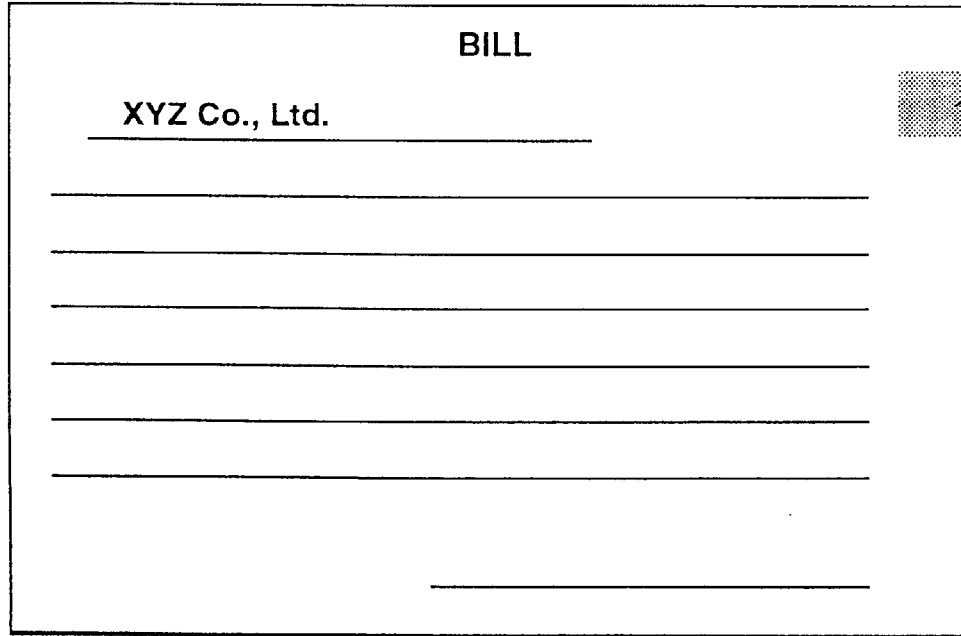

FIGS. 7A and 7B show an actual example of the printed document in which the color tag is printed out by the document printout process. According to a bill shown in FIGS. 7A and 7B, the cell data to be detected is detected based on the evaluation condition, so that the color information is obtained. According to the obtained color information, the color tag is printed out in the "right edge portion" of the bill among the additional areas which are set in the additional area column of the color information table shown in FIGS. 4A to 4C.

Figure 8A:
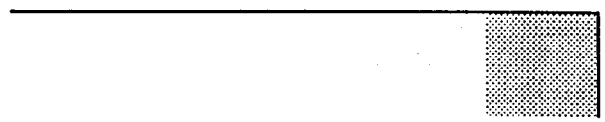
FIGS. 8A to 8C show an example of the document in which the color tag is printed out at an upper-right edge portion of the document.
Figure 8B:
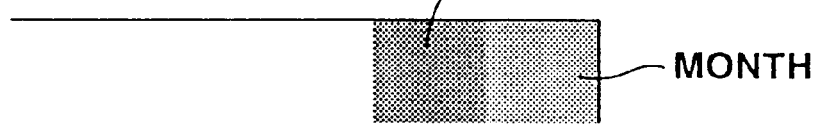
Figure 8C:

Furthermore, FIGS. 8A to 8C show an actual example of the document in which another color tag is printed out. The actual example of the color tags which are printed out in the document shown in FIGS. 8A to 8C shows the example printed in "upper-right corner" of the document among the additional areas which are set in the additional area column in the color information table shown in FIGS. 4A to 4C. Two color tags are printed out in the examples shown in FIGS. 8A to 8C. Left tag indicates "Year" and right tag indicates "month". In such a manner, a plurality of color tags are printed out, so that identification information can be indicated in detail.

In the document shown in FIGS. 8A to 8C, "issue year" and "issue month" are to be detected. In FIG. 8A, since the issue year is 1994, "green" is obtained from the color column of "issue date table" shown in FIG. 5C as the corresponding color information. "Upper-right edge portion" of the document data is obtained from the additional area column of the color information table shown in FIG. 4B. As shown in FIG. 8A, a green color tag is printed out at left. Since the issue month is May, the color information (not shown) (red, tone 5) is obtained from the color column of "issue date table" shown in FIG. 5C. "Upper-right edge portion" of the document is obtained from the additional area column of the color information table shown in FIG. 4B. As shown in FIG. 8A, the color tag of the obtained color is printed out at right. Similarly, the color tag is printed out in FIGS. 8B and 8C.

Figure 9A:
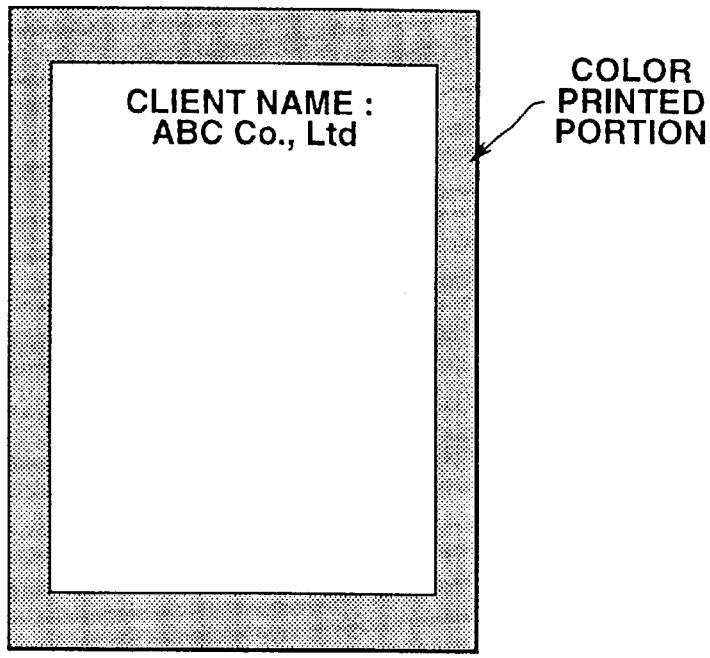
FIGS. 9A and 9B show an example of the document in which the color tag is printed out at a peripheral portion of the document.
Figure 9B:
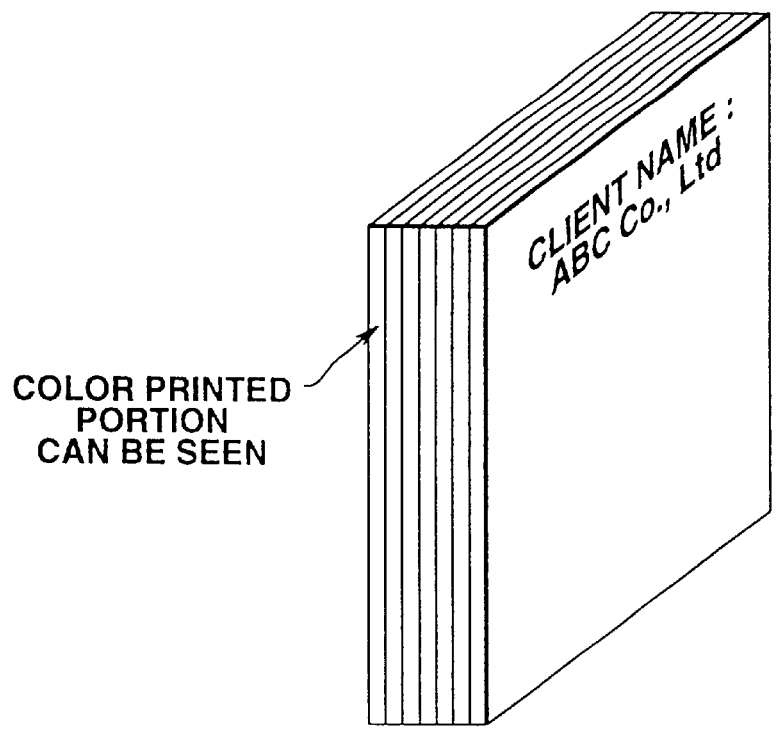

Furthermore, other print example of the color tag is shown in FIGS. 9A and 9B. The color tag shown in FIG. 9A is printed out at the peripheral portion of the document. In such a manner, a color print is carried out at the peripheral portion of the document. Thereby, as shown in FIG. 9B, when the documents are filed, a printed color portion can be seen from the portion shown by an arrow in FIG. 9B. Thus, even if the documents are filed, the issue year, the issue month, etc. can be identified by seeing the colored portion.

As described above, in the computer system 1 according to the first embodiment, the RAM 4 is provided with the color information memory 4d for storing the color information table in which the definition information for defining the cell information to be detected in the document data, the additional area information showing a color tag print position and the dictionary specification information are set, and the color definition dictionary memory 4e for storing various color definition dictionary tables corresponding to the dictionary specification information which is set in the color information table. In the color information table, the cell information to be detected, the item name, the additional area information and the dictionary specification information can be optionally set. In the color definition dictionary table, the evaluation condition and the color information (the color and a tone number) according to the evaluation condition are previously set for each item name to be detected. Accordingly, it is not necessary to set the color information table and the color definition dictionary table for each document data. It is possible to reduce time and labor for defining the color information.

In the document print process, according to the color information table and the color definition dictionary table, the cell in which the item to be detected in the document data to be printed out is set or the additional area in the document in which the color tag is to be printed out is displayed with color, and it is color-printed out. Furthermore, the color definition dictionary table can be changed, and the item to be detected in the document data to be printed out, the color and the position of the color tag print area can be changed. Thereby, according to the evaluation condition for each cell and group of cells at the time of printing the document, a color identification print using the color tag can be easily carried out.

As a result, in a method of sorting the data using the document data, the sorted result can be easily printed out for each color. A document management can be easily carried out. Furthermore, the method is applied to the application program provided with a function of making the document data, so that a print function can be improved.

The document print process of the first embodiment shows such a case that the color of the color tag and the print position are changed according to the evaluation condition corresponding to the cell data to be detected. The process may be used in order to printout a background color all over the document data.

Furthermore, according to the color information table of the first embodiment, each setting item can be optionally set. In this case, the evaluation condition of the cell to be detected can be optionally set, and a variation of a print mode of the document data in which the color tag is printed out can be easily carried out. Furthermore, the document data can be sorted in detail.

FIGS. 10 to 16 show an embodiment of a computer system 10 in which a second embodiment according to the present invention is applied.

Figure 10:
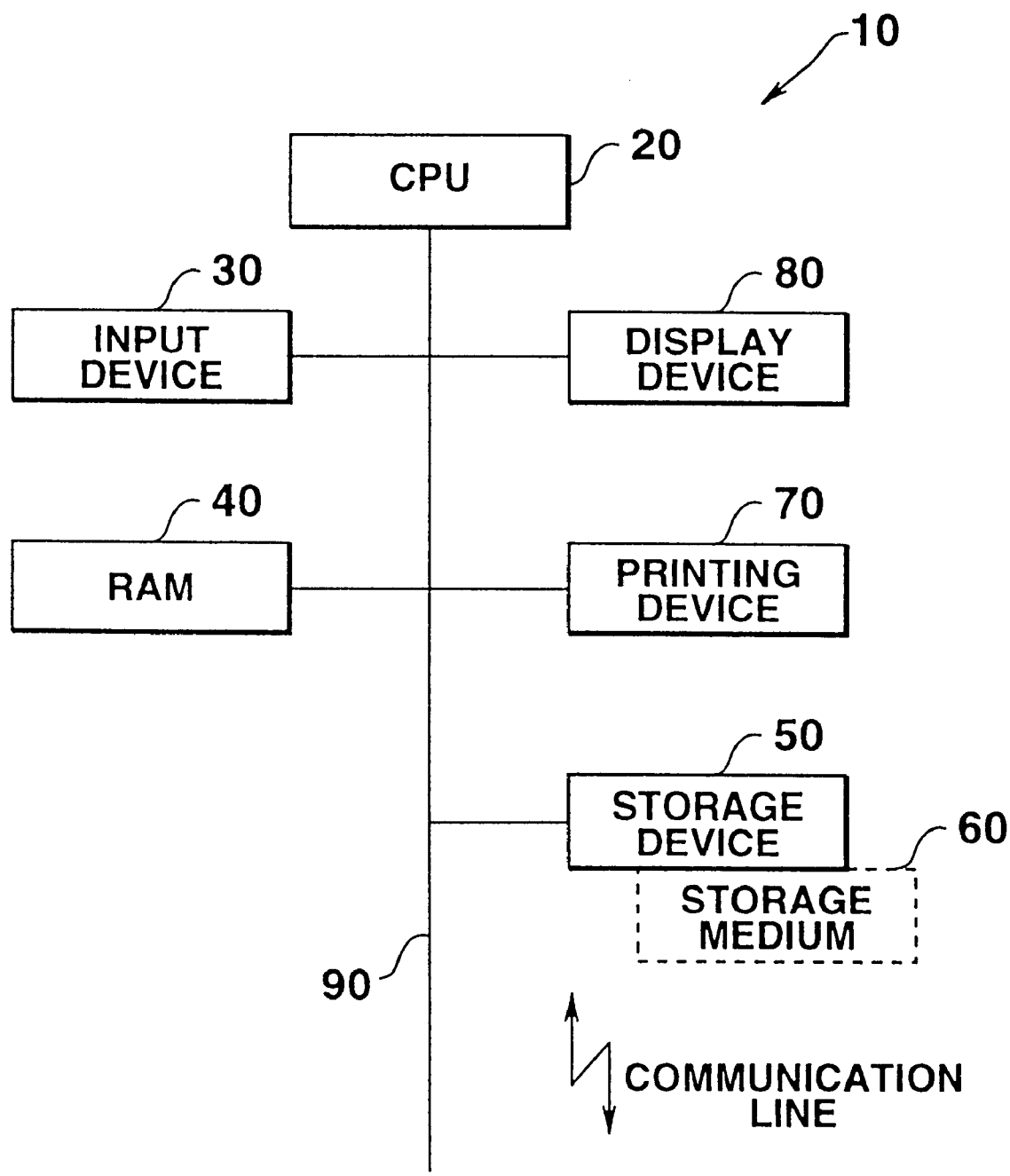
FIG. 10 is a block diagram showing a main portion of a computer system according to a second embodiment of the present invention.
Figure 11:
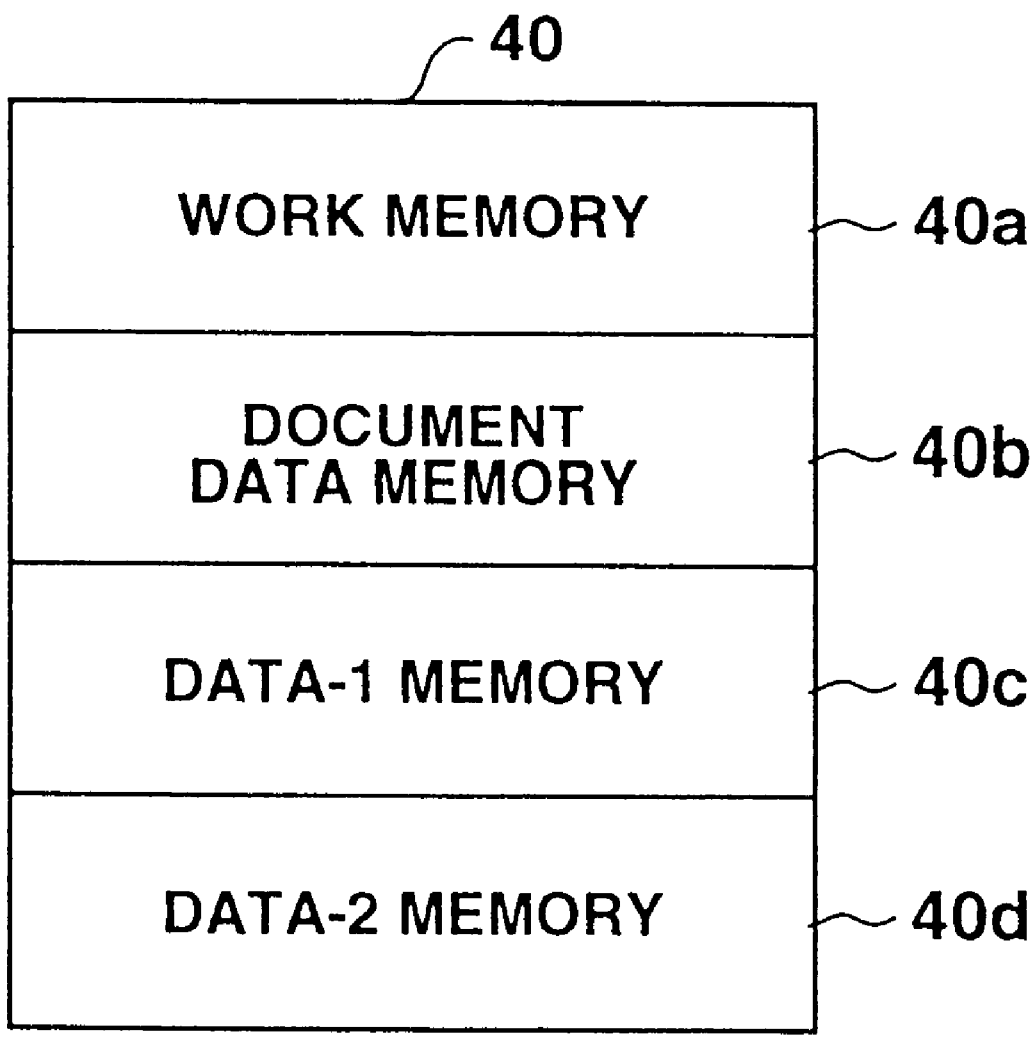
FIG. 11 shows contents of the RAM.

FIG. 10 is a block diagram showing a main portion of the computer system 10. The computer system 10 comprises a CPU 20, an input device 30, a RAM 40, a storage device 50, a storage medium 60, a printing device 70 and a display device 80. Each device is connected to a bus line 90.

The CPU (Central Processing Unit) 20 stores an application program specified among the Windows system program as a GUI and the various application programs corresponding to the Windows system which are stored in the storage device 50 and various instructions or data inputted from the input device 30 in a work memory 40a in the RAM 40. According to the input instruction and input data, various processing are operated based on the application program stored in the RAM 40. The result of processing is stored in the work memory 40a in the RAM 40, and it is displayed in the display device 80. The result of processing stored in the work memory 40a is saved in a given address of the storage device 50 which is instructed by the input device 30.

Furthermore, in the document printout process described below as the output process of the document data stored in a document data memory 40b in the RAM 40, the CPU 20 obtains the document data to be printed out by the document data memory 40b in the RAM 40. An arrangement information of the group of cells in which a halftone print is instructed in each cell data is stored in a data-2 memory 40d in the RAM 40. According to a changing direction information (ascending order, descending order, etc.) stored in a data-1 memory 40c in the RAM 40, the CPU 20 determines a sort direction of numerical value data in an arranged objective cell. A rate of change is calculated from the number of cells to be printed out and the number of halftone levels. Based on a color information which is set in the data-1 memory 40c and the number of halftone levels which the printing device 70 can set, cells are printed out with colors in a sort order with changing the number of halftone levels of the specified color according to the rate of change, so that a plurality of cells are color printed in a sort order.

The input device 30 comprises the keyboard provided with the cursor key, the numerical input key, various function keys, etc. and the mouse being the pointing device. The press signal indicative of the pressed key on the keyboard is supplied to the CPU 20. The operation signal by the mouse is outputted to the CPU 20.

The RAM (Random Access Memory) 40 comprises the work memory 40a for storing the specified application program, the input instruction, the input data, the result of processing, etc., the document data memory 40b for storing the document data, the data-1 memory 40c which stores the set color information for coloring the cell to be halftone-printed in the document printout process, the changing direction information specified in the document printout process and a start/end cell coordinate information, and the data-2 memory 40*d* which stores the arrangement information of the cell corresponding to the cell to be halftone-printed in the document printout process.

The storage device 50 has the storage medium 60 in which the program, the data, etc. are previously stored. The storage medium 60 comprises the magnetic recording media, the optical recording media or the semiconductor memory. The storage medium 60 is fixedly housed in the storage device 50, or the storage medium 60 is detachably mounted to the storage device 50. The storage medium 60 stores the Windows system program as the GUI, various application programs corresponding to the Windows system, the data processed by the document printout processing program and each processing program, etc.

Furthermore, the program, the data, etc. to be stored in the storage medium 60 may be received from another equipment connected via the communication line, etc. Furthermore, the present equipment does not comprise the storage device 50 and another equipment connected via the communication line, etc. are provided with the storage device 50 so that the program and the data stored in the storage medium 60 can be used via the communication line.

The printing device 70 prints out the printout data (the document data, etc.) inputted from the CPU 20 with the specified color.

The display device 80 comprises the CRT (Cathode Ray Tube) display, a liquid crystal display device and the like. The display data inputted from the CPU 20 is displayed with the specified color.

Next, the operation of the second embodiment according to the present invention will be described below.

Figures 12, 13:
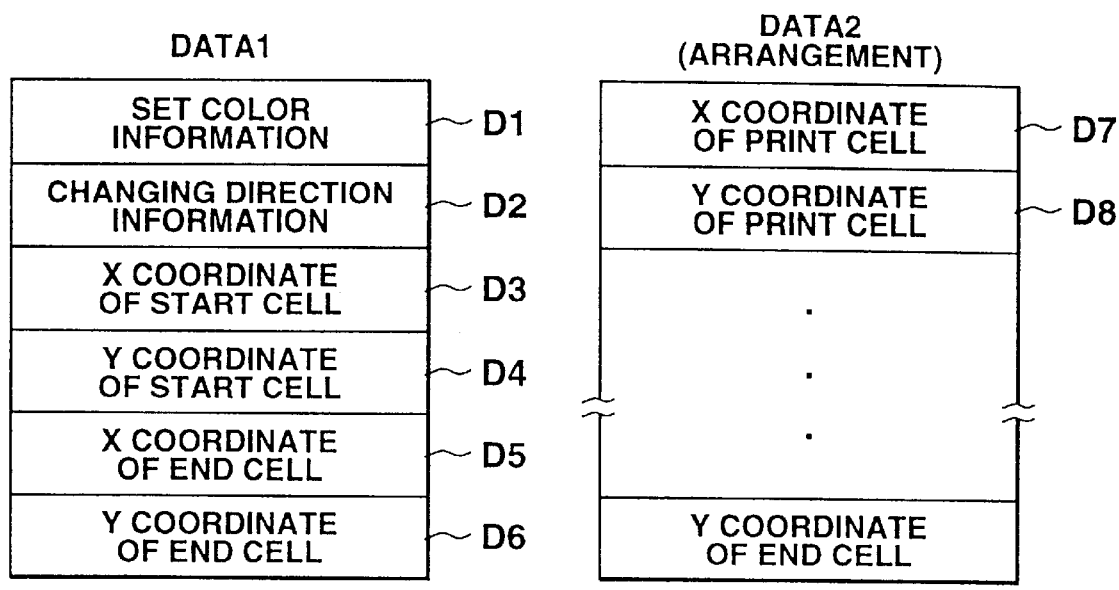
FIG. 12 shows contents of various information stored in a data-1 memory and a data-2 memory in the RAM.
FIG. 13 shows contents of setting items which are set before the document printout process.

FIG. 12 shows various information stored in the data-1 memory 40*c* and the cell arrangement information stored in the data-2 memory 40*d*. As shown in FIG. 12, in the data-1 memory 40*c*, a set color information D1 for coloring the cell to be halftone-printed in the document print our process, a changing direction information D2 which instructs the changing direction (ascending order, descending order, etc.) of the numerical value data specified in the document print our process, an X coordinate D3 and a Y coordinate D4 of a start cell in the specified group of cells to be printed out, and an X coordinate D5 and a Y coordinate D6 of an end cell in the group of cells to be printed out.

Furthermore, as shown in FIG. 12, the data-2 memory 40*d* stores as many x coordinates D7 and Y coordinates D8 of the arrangement position of each cell in the group of cells to be printed out which is specified in the document printout process as the cell to be printed out for each cell to be printed out.

FIG. 13 shows the contents the setting items which are set before the document printout process. The setting items for printing out the document data shown in FIG. 13 comprises a specified color for setting a printing color of a range for setting the specified group of cells to be printed out when the group of cells to be printed out is halftone-printed, and a changing direction for setting the changing direction of the numerical value data in the group of cells to be printed out. FIG. 13 shows such a mode that "blue" is set in the specified color, "A1:A7" is set in the range and "ascending order" is set in the changing direction. "A1:A7" in the range shows the group of cells to be printed out which ranges from a cell A1 to a cell A7. Each setting item which is set in such a manner is stored in the data-1 memory 40*c* in the RAM 40.

Figure 14:
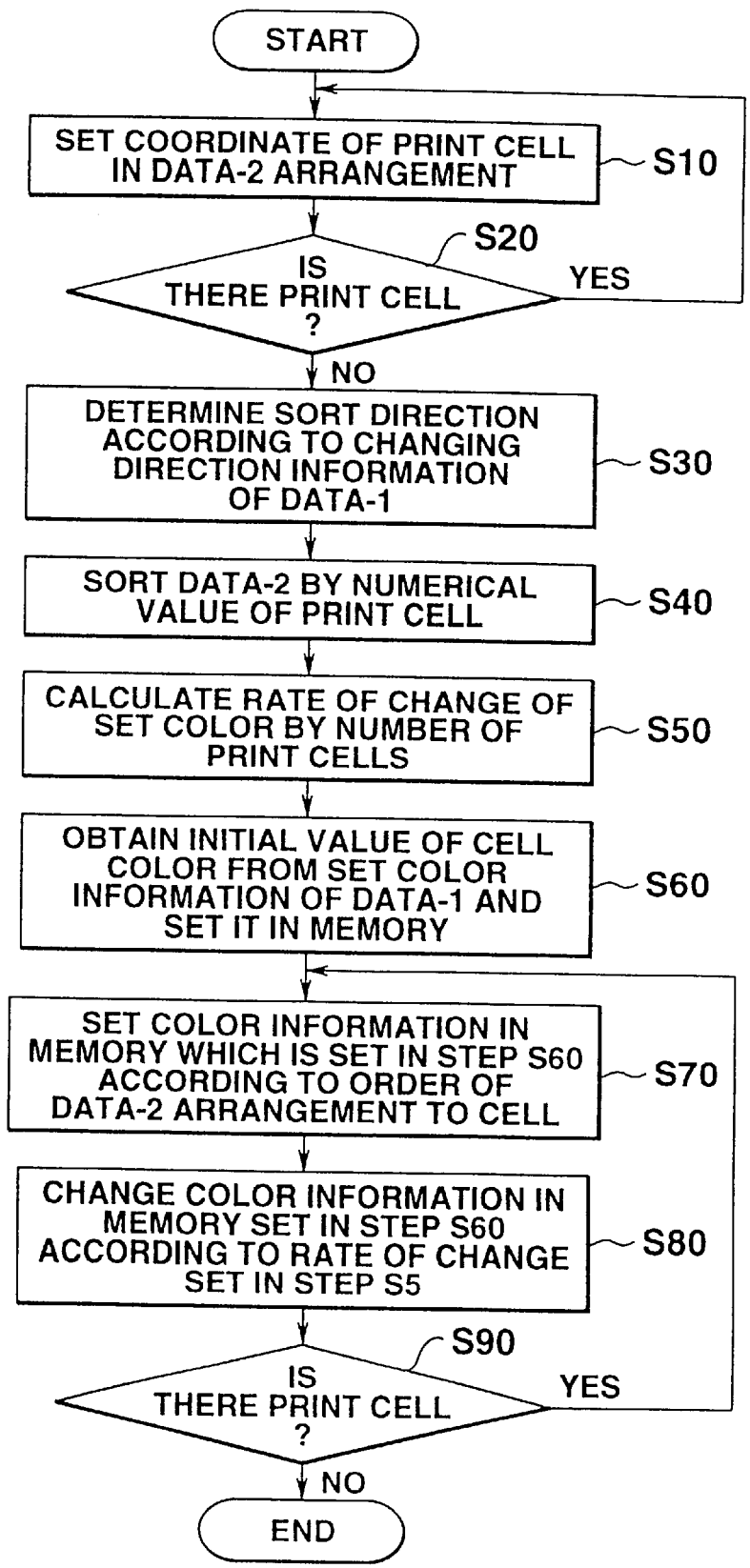
FIG. 14 is a flow chart showing the operation of the document printout process.

The document printout process operated by the CPU 20 will be described with reference to a flow chart shown in FIG. 14. The program for realizing each function described in the flow chart is stored in the storage medium 60 in the program code which can be read by the CPU 20.

At first, the document printout process is instructed by the input from the input device 30. When the document data to be printed out is specified, the CPU 20 starts the document printout process. The document form of the document data is read from the document data memory 40*c* in the RAM 40. The form is developed in the work memory 40*a*, and it is displayed in the display device 80. Then, the document data is developed in the developed document form, and it is displayed in the display device 80. When the group of cells to be halftone-printed is specified in the displayed document data, the cell arrangement information in the group of cells to be halftone-printed is stored in the data-2 memory 40*d* in the RAM 40 as shown in FIG. 12 (step S10).

It is determined whether or not another specified cell to be halftone-printed exists (step S20). When there exists another cell to be halftone-printed, the process is returned to the step S10, so that a store operation of the arrangement information into the data-2 memory 40*d* is repeated. When there is no cell to be halftone-printed, the sort direction of cell to be printed out is determined according to the changing direction information stored in the data-1 memory 40*c* in the RAM 40, for example, according to the ascending order, based on the item set as shown in FIG. 13 (step S30).

The numerical value data of the cells to be printed out according to the arrangement information stored in the data-2 memory 40*d* is sorted according to the sort direction determined in the step S30 (step S40). That is, the numerical value data of the cells to be printed out is sorted in the ascending order. Next, the rate of change of the set color is calculated based on the sorted cells (step S50). That is, according to a relationship between the number of the cells to be printed out and the halftone number which is set in the printing device 70, the rate of change between the sorted cells is calculated as "halftone number/number of cells".

Next, according to the set color information stored in the data-1 memory 40*c* in the RAM 40, an initial value of the set color is obtained. That is, "blue" shown in FIG. 13 is obtained, and it is set on the work memory 40*a* (step S60). According to an arrangement of the cells to be printed out which is stored in the data-2 memory 40*d*, "blue" being the color information on the memory which is set in the step S60 is set in the next cell to be printed out (step S70). Next, the halftone is changed according to the rate of change calculated in the step S50, so that "blue" being the color information in the memory which is set in the step S60 is displayed in the display device 80. The displayed contents are printed out with color by the printing device 70 with a predetermined paper (step S80).

That is, for example, when the group of cells to be halftone-printed is specified as the range (A1 to A7) as shown in FIG. 13 relative to the document data shown in FIG. 15A, the number of the cells A1 to A7 to be printed out is "7", and a halftone number which is set relative to the printing device 70 is "3". In case of the cell A1, the rate of change to be calculated in the step S50 is $1 \times (3/7) \approx 0.42$. The halftone number is set to "1". The set color "blue" is displayed in the cell A1 with the halftone number "1". Similarly, relative to other cell to be printed out, the rate of change is calculated, and the halftone number is set.

The rate of change of the cell A2 becomes $2 \times (3/7) \approx 0.85$. The halftone number is set to "1". The set color "blue" is displayed in the cell A2 with the halftone number "1". The rate of change of the cell A3 becomes $3 \times (3/7) \approx 1.1$. The halftone number is set to "2". The set color "blue" is displayed in the cell A3 with the halftone number "2". Furthermore, the rate of change of the cell A4 becomes 4×(3/7)≈1.7. The halftone number is set to "2". The set color "blue" is displayed in the cell A4 with the halftone number "2". The rate of change of the cell A5 becomes 5×(3/7)≈2.1. The halftone number is set to "3". The set color "blue" is displayed in the cell A5 with the halftone number "3". Furthermore, the rate of change of the cell A6 becomes 6×(3/7)=2.5. The halftone number is set to "3". The set color "blue" is displayed in the cell A6 with the halftone number "3". The rate of change of the cell A7 becomes 7×(3/7)=3. The halftone number is set to "3". The set color "blue" is displayed in the cell A7 with the halftone number "3".

As a result, as shown in FIG. 15B, the specified color "blue" is displayed in each cell which is specified to be halftone-printed with the halftone numbers "1" to "3" according to the rate of change. The cells are sorted according to "ascending order" being the sort direction, so that the arrangement is changed. As a result, as shown in FIG. 16, the arrangement of the cells to be printed out is changed, and the cell coordinate, a set background color "blue" and the halftone numbers "1 to 3" are set so as to be matched to the arrangement.

The process is returned to step S90, so that it is determined whether or not there remains any cell to be printed out. When there is the cell to be printed out, the process is returned to the step S70, and the process is returned to a halftone number changing process according to the process of setting the color information and the rate of change of the color information in the step S80. When there is no cell to be printed out, the process is completed.

As described above, according to the computer system 10 of the second embodiment, in the document printout process, the rate of change is calculated for each cell based on the halftone number which is set relative to the printing device 70 and the number of cells according to the previously specified cell range to be halftone-printed, a basic color and the changing direction (sort direction). The cell order is determined according to the specified changing direction. According to the rate of change and the cell order, the basic color and the halftone number are automatically set as the background color of each cell, and the color print is outputted from the printing device 70. Accordingly, it is not necessary to define a color specification for each cell, and it is possible to save time and labor to define the color information in the cell to be printed out.

Furthermore, in the document printout process, according to the contents of the data-1 memory 40c and data-2 memory 40d, the halftone number is automatically set relative to each cell in the group of cells to be printed out which is instructed in the document data to be printed out, according to the rate of change for each cell and the cell order. A color display is carried out, and the color print is outputted. Accordingly, according to a change condition in the group of cells to be printed out which is specified when the document data is printed out, a color identification output can be easily carried out.

As a result, in a method of analyzing the data using the document data, the analysis result can be easily outputted by the change of the halftone number of the specified color. The application program provided with the function of making the document data is applied, so that the data output function can be improved.

According to the document printout process of the second embodiment, such a case that the halftone number (printing density) of the background color of the cell is changed according to the rate of change for each cell and the sort order is described. The pitch of a meshing pattern may be changed. A color of the character printed by the numerical value data in the cell may be changed. Furthermore, a character size of the numerical value data in the cell may be changed.

In this case, in the method of analyzing the data using the document data, the analysis result can be easily outputted as the change of the meshing pattern, the change of the character color and the change of the character size.

According to the document printout process of the embodiment, relating to the set contents (each setting item of the cell range, the basic color and the changing direction) and the document data shown in FIGS. 15A, 15B and 16, such a case that the tone of the basic color is changed according to the rate of change of the cell to be printed out and the sort order is described above. Relating to other set contents and other document data, similarly, the tone of the basic color is changed according to the rate of change of the cell to be printed out and the sort order, so that the output can be carried out.

Industrial Applicability

According to the present invention, there is provided a document output device in which the user can simply identify a type of the document data and inherent information of the document data by its appearance at a glance according to a color of an image which is additionally printed at a predetermined position on the document data.

What is claimed is:

1. A document printing device for printing a document including plural data items in a predetermined form, the device comprising:

area storage means for storing plural areas of the document respectively corresponding to the plural data items;

color storage means for storing plural colors corresponding to the contents of the Plural data items;

means for specifying one of the plural data items;

area determining means for determining one of the plural areas based on the specified one of the plural data items using said area storage means;

color determining means for determining one of the plural colors based on the content of the specified one of the plural data items using said color storage means; and means for printing the document in the predetermined form with a tag being printed in the area determined by said area determining means and in the color determined by said color determining means.

2. The document printing device according to claim 1, wherein:

said specifying means specifies plural predetermined data items;

said area determining means respectively determines areas for the specified plural data items;

said color determining means respectively determines colors for the specified plural data items; and said printing means prints the document with plural tags being printed in the areas determined by said area determining means and in the colors determined by said determining means.

3. The document printing device according to claim 1, wherein said color determining means comprises a color table storing judgment conditions relating to the contents of the specified data item and colors corresponding to the judgment conditions, and determines which of the judgment conditions is satisfied based on the content of the specified data item, and then determines the color of the tag to be printed in the area determined by said area determining means based on the judgment condition which is satisfied by the contents of the specified data item.

4. The document printing device according to claim 1, wherein said area determining means determines, as the area of the document in which the tag is to be printed, an area including a peripheral portion of the document, thereby permitting the peripheral portion of the document to be identified by color when the document is filed.

5. The document printing device according to claim 1, wherein said specifying means specifies, as the data item among the plural data items, one of data items relating to date, month, and year.

6. A recording medium having stored thereon a computer readable program for enabling a computer to cause a document printing device to print a document including plural data items in a predetermined form, said program comprising:

code means for enabling the computer to store plural areas of the document respectively corresponding to the plural data items;

code means for enabling the computer to store plural colors corresponding to the contents of the plural data items;

code means for enabling the computer to specify one of the plural data items;

code means for enabling the computer to determine one of the plural areas based on the specified one of the plural data items;

code means for enabling the computer to determine one of the plural colors based on the content of the specified one of the plural data items; and code means for enabling the computer to cause the document to be printed in the predetermined form, with a tag being printed in the determined area and in the determined color.

* * * * *

UNITED STATES PATENT AND TRADEMARK OFFICE
CERTIFICATE OF CORRECTION

PATENT NO. : 6,298,359 B1 Page 1 of 1
DATED : October 2, 2001
INVENTOR(S) : Masao Konishi et al.

It is certified that error appears in the above-identified patent and that said Letters Patent is hereby corrected as shown below:

<u>Title page,</u>
Item [54], Title, after "DOCUMENT OUTPUT DEVICE" insert -- FOR OUTPUTTING A DOCUMENT IN A PREDETERMINED FORM WITH A COLOR TAG OF AN ARBITRARY COLOR PRINTED AT AN ARBITRARY AREA OF THE DOCUMENT IN AN EASY SETTING --;

Item [56], References Cited, U.S. PATENT DOCUMENTS,
insert -- 5,471,612    11/1995    Schlafly....707/104
         5,339,392    8/1994     Risberg et al....345/333
         5,247,611    9/1993     Norden-Paul et al...707/509
         5,194,969    3/1993     DiFrancesco....358/463
         5,231,577    7/1993     Koss..........707/504 -- and insert -- FOREIGN PATENT DOCUMENTS
         0 514 101 A2   11/1992  EPO
         0 535 987 A2   4/1993   EPO
         0 475 734 A2   3/1992   EPO
         0 416 818 A2   3/1991   EPO
         0 366 425 A1   5/1990   EPO --.

Signed and Sealed this

Fifteenth Day of July, 2003

JAMES E. ROGAN
*Director of the United States Patent and Trademark Office*